(12) United States Patent
Sheth (10) Patent No.: US 10,229,273 B2
(45) Date of Patent: *Mar. 12, 2019

(54) IDENTIFYING COMPONENTS FOR STATIC ANALYSIS OF SOFTWARE APPLICATIONS

(71) Applicant: Veracode, Inc., Burlington, MA (US)

(72) Inventor: Mansi Sheth, Merrimack, NH (US)

(73) Assignee: Veracode, Inc., Burlington, MA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/224,785

(22) Filed: Aug. 1, 2016

(65) Prior Publication Data

US 2018/0032735 A1 Feb. 1, 2018

Related U.S. Application Data

(63) Continuation of application No. 14/631,541, filed on Feb. 25, 2015, now Pat. No. 9,405,906.

(51) Int. Cl.
| | |
|---|---|
| *G06F 21/56* | (2013.01) |
| *G06F 21/57* | (2013.01) |
| *G06F 9/44* | (2018.01) |
| *G06F 8/75* | (2018.01) |

(52) U.S. Cl.
CPC .............. *G06F 21/577* (2013.01); *G06F 8/75* (2013.01); *G06F 21/562* (2013.01); *G06F 2221/033* (2013.01)

(58) Field of Classification Search
CPC ........ G06F 21/562; G06F 21/577; G06F 8/75; G06F 2221/033
See application file for complete search history.

(56) References Cited

U.S. PATENT DOCUMENTS

| | | | | |
|---|---|---|---|---|
| 8,407,800 B2* | 3/2013 | Schloegel | ............. | G06F 21/577 717/104 |
| 9,075,625 B1* | 7/2015 | Muth | ...................... | G06F 21/53 |
| 9,135,405 B2* | 9/2015 | Brumley | ................. | G06F 21/00 |
| 9,785,777 B2* | 10/2017 | Sharma | ................. | G06F 21/577 |
| 9,892,262 B2* | 2/2018 | Schmitt | ................. | G06F 21/577 |
| 2013/0227516 A1* | 8/2013 | Kriegsman | ............... | G06F 8/77 717/101 |
| 2014/0281424 A1* | 9/2014 | Bobba | ................... | G06F 9/3005 712/225 |
| 2015/0089656 A1* | 3/2015 | Pappas | .................. | G06F 21/577 726/25 |
| 2015/0143339 A1* | 5/2015 | Rajanna | .................... | G06F 8/43 717/123 |
| 2017/0169229 A1* | 6/2017 | Brucker | ................ | G06F 21/577 |

* cited by examiner

*Primary Examiner* — Linglan E Edwards
(74) *Attorney, Agent, or Firm* — Gilliam IP PLLC (57) ABSTRACT

In a system for determining components of a software application from binary code thereof, one or more binary files are read without loading any component/object in the files in an execution environment that can execute the software application. A component in one of the files, designated as a primary component, is visited to identify a path specifying origin of a secondary component that is associated with the primary component, and the identified path is stored. Analysis of the path can indicate whether the secondary component is provided by the developer of the software application or by a different entity.

20 Claims, 4 Drawing Sheets

```
Java Class name : test.java

Package example.Test;

import java.util.*;
    .
    .

Class test {
    .
  Method a() {
    ArrayList<> aList = new ArrayList<>() ;
    aList.add("Patent");
  }
}
```

FIG. 1C

```
<?xml version="1.0" encoding="ISO-8859-1"?>

<!DOCTYPE web-app SYSTEM "http://java.sun.com/dtd/web-app_2_3.dtd" PUBLIC "-//Sun
Microsystems, Inc.//DTD Web Application 2.3//EN">
-<web-app>
<!-- General description of your web application -->
 <display-name>WebGoat</display-name> <description> This web application is designed to
demonstrate web application security flaws for the purpose of educating developers and
security professionals about web application security problems.
```

\*
\*
\*

```
-<servlet> <servlet-name>WebGoat</servlet-name> <description> This servlet plays the "controller"
role in        </description>
<servlet-class>org.owasp.webgoat.HammerHead</servlet-class>
-<init-param> <param-name>email</param-name>
```

IDENTIFYING COMPONENTS FOR STATIC ANALYSIS OF SOFTWARE APPLICATIONS

FIELD OF THE INVENTION

This disclosure generally relates to systems and methods that can aid in static binary analysis of a software application, and more particularly to systems and methods for identification of the components of a software applications from a binary thereof.

BACKGROUND OF THE INVENTION

Software applications typically include flaws or defects, causing the software to operate in an unintended or undesired manner. Some defects can also be exploited to gain unauthorized access to the software and/or data associated therewith. Static vulnerability analysis techniques that can analyze the source code and/or one or more compiled binary files corresponding to a software application can be used to detect such vulnerabilities. A static analyzer that can analyze one or more compiled binary files corresponding to a software application is useful at least in situations where the source code is unavailable for a number of reasons, e.g., when the owner of the source code wishes not to disclose the source code to the tester performing the static analysis, when a portion of the binary files is obtained from a third party and the corresponding source code is not available from the third party, etc. As used herein, binary files are not limited to machine code only and may include files that are derived by processing source code and that include representations that are not source code representations, such as byte code, object code, intermediate representation, etc., where these representations are dependent on the respective programming languages used.

One or more binary files associated with a software application typically include several components such as data structures, classes, methods, functions, interfaces, etc. Some components are provided or written by the software developer (also called the first party) and some components may be provided by one or more third parties, such as vendors and providers of open-source code. In many situations, the software developer develops one or more components that are based on or derived from one or more third-party components. In code written in Java, for example, a third party may supply a base class and the software developer may then extend that class.

If only the binary file or files associated with a software application are available for analysis, various software-application components and the intricate relationships therebetween, identifying any third-party components, may not be discerned readily, e.g., by a static analyzer. A runtime environment may load all the required components during execution thereof and can thus identify all the components associated with the software application. Analysis relying on the runtime environment, typically called dynamic analysis, however, can encounter several problems and may not be feasible. For example, the party performing the analysis may not have access to adequate test data, may not have licenses to execute certain third-party components, which can prevent the execution of the software application by the analyzing/testing party. The dynamic analysis may also expose the tester's system vulnerable to any malicious code that may be present in the binaries that are analyzed.

Some static analyzers can determine the intricate relationships between various software components and/or may identify all of the software components associated with the software application to be analyzed/tested, but the static analyzers often do not distinguish between the components supplied by the software developer and those provided by vendors including commercial vendors and those that provide the components as open source. Therefore, the static analysis may not be focused on the developer-supplied components. Some static analyzers may also fail to identify all of the developer-provided software components and, as such, any subsequent analysis of the software application, such as vulnerability analysis, may be incomplete and/or erroneous.

SUMMARY OF THE INVENTION

Various embodiments of the present invention can facilitate identification of one or more software components associated with a software application, without accessing the source code of the software application and without loading in a runtime environment one or more binary files associated with the software application. Various embodiments can also distinguish between the developer provided components and other components. This is achieved, at least in part, by programmatically analyzing one or more binary files associated with a software application, and by evaluating one or more components in the analyzed binary files. The evaluation generally includes determining a path of the component. As used herein, a path generally represents a hierarchical structure within a package or a library that defines the component under evaluation. An analysis of the path, e.g., the path name, may indicate that the package/library is provided by the developer of the software application or, in the alternative, by a third party, such as a vendor, including vendors of open source packages/libraries/components.

Accordingly, in one aspect, a method of determining components of a software application from binary code thereof includes reading by a processor a binary file associated with a software application. The file can be a class file, a .jar file, an .ear file, etc., for software applications specified in Java, and other types of binary files for software applications written in other programming languages. The file may be compressed or uncompressed, and a compressed file may be read/parsed without uncompressing the file. The file is read without loading any component/object in the file in an execution environment that can execute the software application. The method also includes visiting by the processor a component (designated as a primary component) specified in the binary file. The primary component can be a class, an interface, a method, etc. The method further includes identifying by the processor a path specifying origin of a secondary component that is associated with the primary component, and storing the identified path.

In some embodiments, the secondary component is the same as the primary component. Alternatively, the secondary component may be a different component that is related to the primary component. Thus, in various embodiments, if a primary component is a method, the corresponding secondary component can be a class defining the method and/or if a primary component is an extended class, the corresponding secondary component can be a base class. The primary component may be a class or a method that invokes another method, and the secondary component can be the invoked method or a class defining the invoked method. The binary file may be derived from source code specified in Java, Python, and/or .NET, etc.

In some embodiments, the secondary component is related to the primary component, and the method further includes reading by the processor a different binary file associated with the software application and with the secondary component. For example, the primary component is an extended class and the secondary component is a base class defined in a different binary file by the developer of the software application. If the secondary component is supplied by a third party, the different binary file, which is provided by the third party, is not read or analyzed. In some embodiments, the binary file includes a Java class file. The primary component may be an extended class, and the corresponding secondary component may be a base class corresponding to the extended class. Alternatively, the primary component may be a method, and the corresponding secondary component may be a class defining the method. The method can be an overridden method.

In some embodiments, the method includes visiting an invoking component that invokes the primary component. For example, a method specified by the developer of the software application/first-party (i.e., an invoking component), may call another method (i.e., a primary component), which can be provided by the first party or by a third party. The other invoked method may be related to a class (i.e., a secondary component) that may be provided by the third party that provided the class, a different third party, or by the first party. Thus, the invoking component may include a developer/first party-provided component and the primary component may include a vendor/third party-provided component. Specifically, a first-party provided class may instantiate a third-party provided class and/or a first-party provided class/method may call a third-party specified method. In some embodiments, the primary component is or includes a developer/first party-provided component and the secondary component is or includes a vendor/third party-provided component. The primary component may include a developer-provided component and the secondary component may also include a developer-provided component.

In some embodiments, the method further includes generating the binary file by compiling a script, such as a JavaServer Pages or PHP script. The compilation may produce a number of binaries, from which the binary file to be analyzed may be selected according to a naming convention. The method may also include parsing a script file, such as an EXtensible Markup Language (XML) according to at least one specified parameter to determine a path of a component of the binary file. As described above, the path generally represents a hierarchical structure within a package or a library that defines the component. One or more of the various steps of the method described above may be repeated with respect to each one of a number of primary components, to store several paths corresponding to those components. The stored paths can be paths associated with various primary components themselves and/or paths associated with the secondary components that are related to primary components. In addition, in some embodiments, the step (a) may be repeated for different binary files associated with a software application to be analyzed.

In some embodiments, the method includes identifying a set of developer-provided components that are related to the several stored paths, and identifying a set of components that are related to the stored paths and that are provided by a vendor. Optionally, at least one path from the various paths that is related to the set of components provided by the vendor may also be identified. In some embodiments, the method includes receiving a list of entry points generated by a static analyzer through analysis of the software application, and verifying that the list of entry points includes each of the several paths that are identified. If the list of entry points generated/explored by the static analyzer does not include a path identified/extracted according to the various embodiments described herein, a false negative can be said to be detected.

A vendor-provided library may be associated with a path from the several identified/stored paths, and the vendor-supplied library may include a set of vendor-provided components. The method may include identifying from the set a subset of vendor-provided components such that each vendor-provided component in the subset is related to at least one of the primary components. For each vendor-provided component in the subset, a path related to the vendor-provided component may be identified. As such, if a third-party module (e.g., a library) is included in the software application, but not all third-party components are used in the software application, the identified subset of vendor-provided components and the related path(s) may later be used by a static analyzer to analyze/support the third-party library in an efficient manner. This information can also be used to avoid reporting issues regarding a third-party library if those issues are limited to components that are not used in the software application being analyzed. The set of vendor-provided components may include a component that is designated as vulnerable, and the method may include determining if the subset of vendor-provided components includes the component designated as vulnerable. Thus, if a component in a vendor library is vulnerable, the developer need not be alerted as long as the vendor components used in the software application do not include the component designated as vulnerable.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to determine components of a software application from binary code thereof by reading a binary file associated with a software application. The instructions program the processing unit to read the file without loading any component/object in the file in an execution environment that can execute the software application. The instructions further program the processing unit to visit a component (i.e., a primary component) specified in the binary file, to identify a path specifying origin of a secondary component that is associated with the primary component, and to store the identified path. In various embodiments, the instructions can program the processing unit to perform one or more of the method steps described above.

In another aspect, an article of manufacture that includes a non-transitory storage medium has stored therein instructions which, when executed by a processor program the processor, which is in electronic communication with a memory, to determine components of a software application from binary code thereof by reading a binary file associated with a software application. To this end, the instructions program the processor to read the file without loading any component/object in the file in an execution environment that can execute the software application. The instructions further program the processor to visit a component (i.e., a primary component) specified in the binary file, to identify a path specifying origin of a secondary component that is associated with the primary component, and to store the identified path. In various embodiments, the stored instructions can program the processor to perform one or more of the method steps described above.

As such, in various embodiments, all of the software components used in a software application and their respective paths can be identified. This information may be used, e.g. to determine if a static analyzer performed a comprehensive analysis of the software application, to direct subsequent analysis only to those components of a third-party package/library that are actually used in the software application, to obtain vulnerability information about those components from third-party packages/libraries that are used in the software application, and to supplement any vulnerability analysis with such obtained information, etc.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1A:
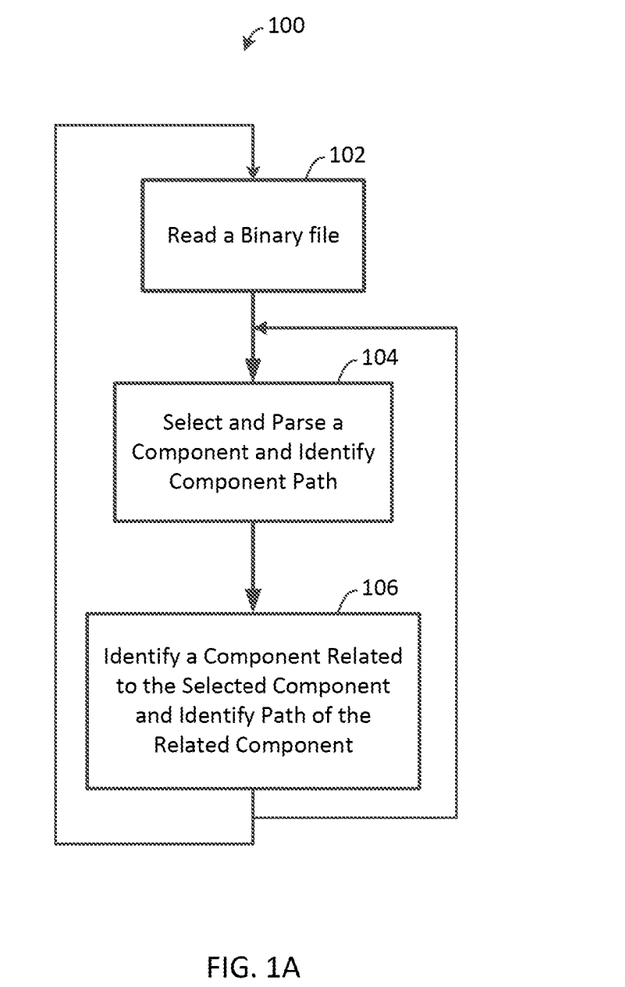
FIG. 1A illustrates one example of a process of identifying components, their relationships, and/or their respective paths, according to one embodiment.
Figure 1B:
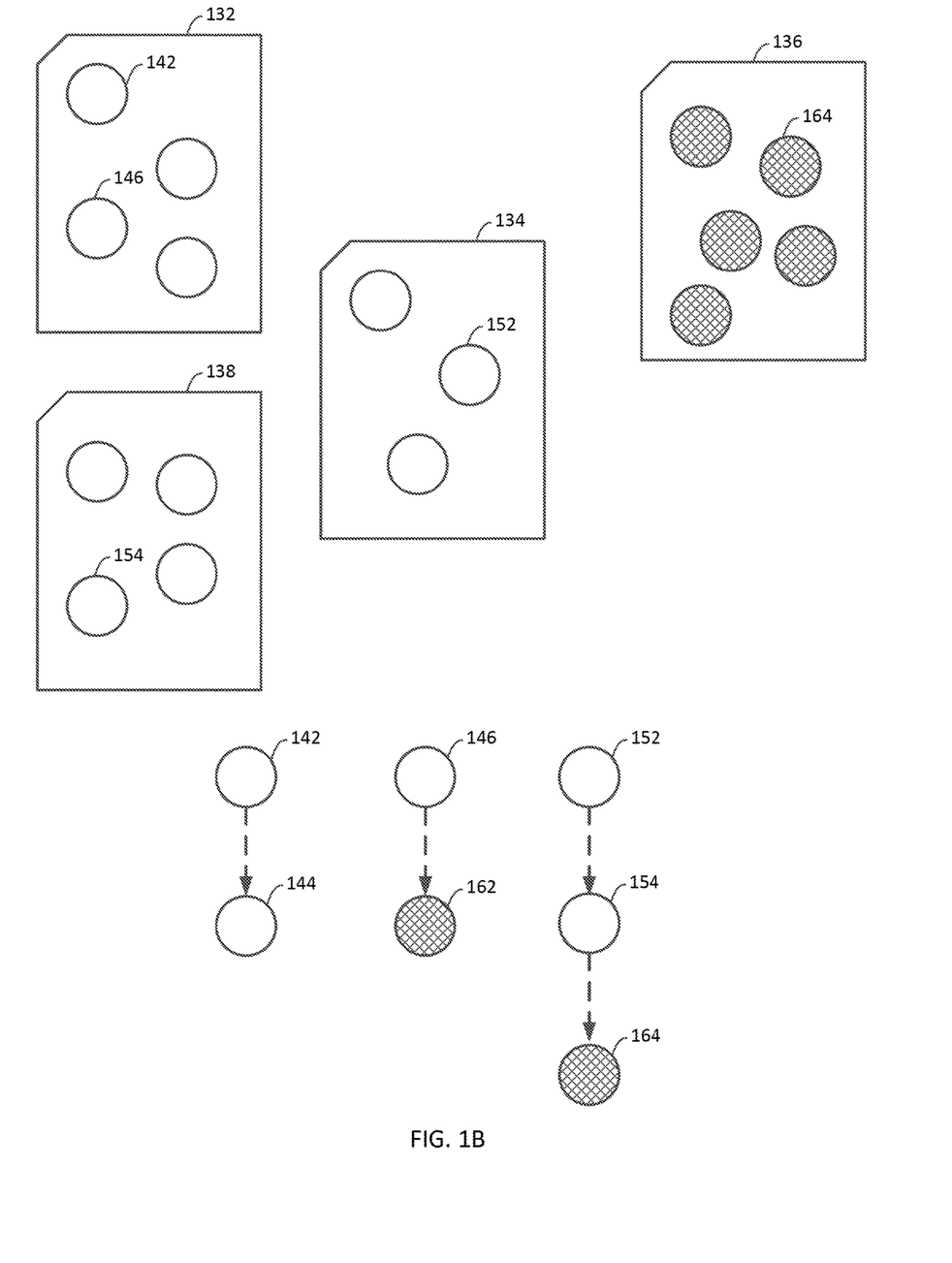
FIG. 1B schematically depicts some components, as examples, that are used in a software application.

With reference to FIGS. 1A and 1B, in a process 100, a binary file 132 associated with a software application is read at step 102, without loading the file 132 in an execution environment. The file 132 may be accessed individually or may be accessed as a part of a collection. For example, if the file 132 is a Java class file, that class file may be a part of a group of .jar files optionally included in one or more .war files that are optionally included in an .ear file. The .ear file, one or more .war files, one or more .jar files, and/or one or more class files may be compressed. In some embodiments, reading a file at the step 102 includes reading a compressed file without uncompressing it, and in some embodiments, a compressed file is uncompressed while reading that file.

One of the one or more components (e.g., classes, methods, interfaces, etc., for Java code, and data structures, methods, and functions, in general) in the file 132 is then parsed in step 104. For example, a component 142 is parsed in the step 104. An analyzer such as Byte Code Engineering Library (BCEL) for Java or any other suitable analyzer for Java and/or other languages such as .NET, C, C++, etc., that allows for a customizable parsing of the components included in a binary file may be used for the parsing. The parsing in the step 104 is customized for identifying and recording a path associated with a visited component. In step 106, the path is analyzed to determine if a relationship exists between the visited component 142 and another component 144. For example, the component 142 may be a class extending a base class. A path associated with the related component 144 (i.e., the base class) may also be recorded.

Figure 1C:
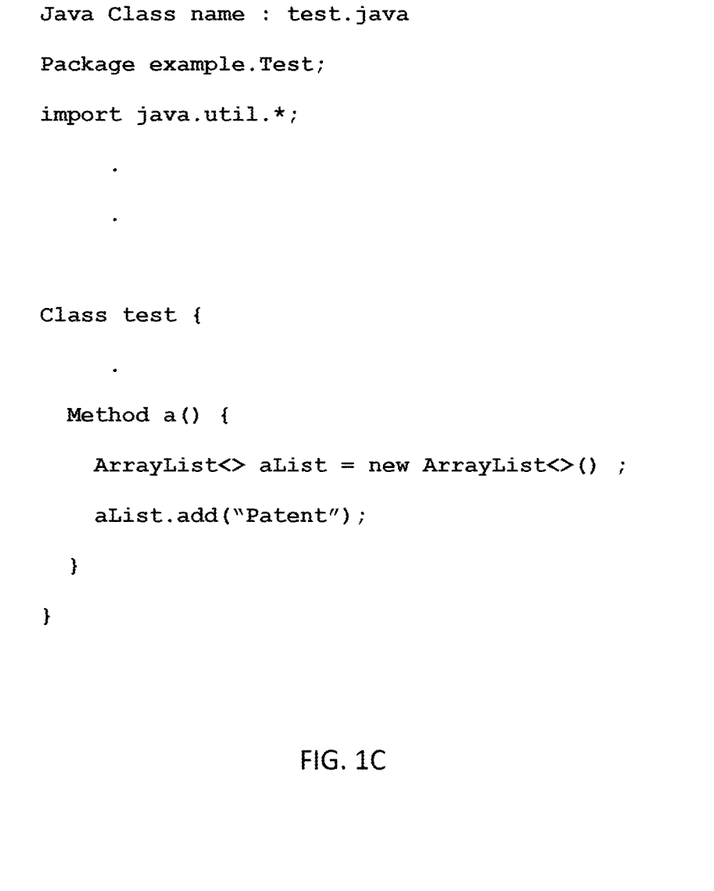
FIG. 1C depicts an example of Java code to which the embodiment of the process depicted in FIG. 1A is applied, according to one embodiment.

Referring to FIGS. 1A and 1C, after reading a binary file associated with the package "example," a component, i.e., the class test, may be selected in step 104. The path of this component is identified as "example." This component is described by the developer of the software system being analyzed. During parsing of the component "class test" two related components, namely, a class "ArrayList" and a method "add( )" are identified in step 106. The paths associated with these related components are determined in step 106 to be "java.util" and, as such, these two components are determined to be third-party components. It should be understood that the example depicted in FIG. 1C is illustrative only and that a typical binary file may include several components associated with one or more paths. One or more components at a single or different paths may be related to any of the components in the binary file. One or more of these related components may be specified by the developer of the binary file and/or one or more of the related components may be provided by one or more third parties. Furthermore, additional components may be related to one or more of the related components, and any of these additional components may be provided by the developer and/or by a third party.

Referring back to FIGS. 1A and 1B, it should be noted that the recorded paths are not physical locations of the components 142, 144 in memory or on disc or another storage medium. Instead, as described above, the path generally represents a hierarchical structure within a package or a library. To illustrate, in the foregoing example, the component 142 can be "SpecialSort"—a Java class that extends a base class "SelectionSort," i.e., the component 144, that is defined in a package "myorg.mathlib.sortutils." As such, in the foregoing example, the path associated with the component 144 is or includes "myorg.mathlib.sortutils." The term "myorg" in the path may indicate that the package that includes the component 144 is provided by the developer of the software application, i.e., by the first party. The component 144 may be included in the same or a different binary file. In general, the component 142 is called a primary component and the related component 144 is called a secondary component.

In another example, a component 146, also specified in the file 132, can be a class "ShiftedCorrelation" that is provided by the software application developer and that extends a base class "Correlation," i.e., a component 162 that is provided in a package "vendorX.stats.functions." As such, a path associated with the component 146 ("ShiftedCorrelation") and with the related component 162 ("Correlation") may be or may include "vendorX.stats.functions." The term "vendor" in the path may indicate that the package is provided by the vendor "X," i.e., by a third party. The package may be provided under a contract according to commercial license or under an open source license. While the examples of paths discussed above include three strings separated by the "dot" character as the delimiter, a path in general, can include fewer than three (i.e., one or two) and more than three (e.g., 4, 5, 8, etc.) strings separated by "dots" or other delimiters.

In general, the parsing and path determination step 104 and the path analysis step 106 may be repeated for each component in a file that was read in the step 102 (e.g., the file 132). Moreover, the step 102 may be repeated for one or more additional binary files associated with the software application, i.e., such additional files may be read in the step 102, and the steps 104-106 may be executed for the components from each of such additional files. During such analysis, a multi-stage relationship between components and the corresponding paths may be generated in various embodiments.

For example, a component 152 may be visited in one iteration of the step 104. The component 152 may be a method that instantiates a class 164 and invokes an overridden method 154 of the class 164. During the execution of the steps 104, 106, it may be determined that the components 152, 154 are provided by the first party, i.e., the developer of the software application and that the component 164 is provided by a third party. The component 152 may be included in the file 132, which is read in one iteration of the step 102. Alternatively, as shown in FIG. 1B, the component 154 may be included in another binary 134, which may be read in another iteration of the step 102.

The components 152, 154 may be analyzed in different respective iterations of the steps 104, 106. During this analysis, once it is determined that the component 164 is related to the component 152 and is provided by a third party, in a file 136, neither the file 136 nor any component therein, including the component 164, is analyzed. The component 154 may be provided in yet another binary file 138 that is provided by the developer/first party. Therefore, the component 154 is analyzed, along with any other components in the file 138, when that file is read. The analysis performed in the steps 104, 106 can infer the relationship between the components 152, 164, 154, that the method 152 (that can be referred to as an invoking component), invokes another method 154 (that can be referred to as a primary component), and that the method 154 overrides a method of a third-party supplied class 164 (that can be referred to as a secondary component).

Figure 2:
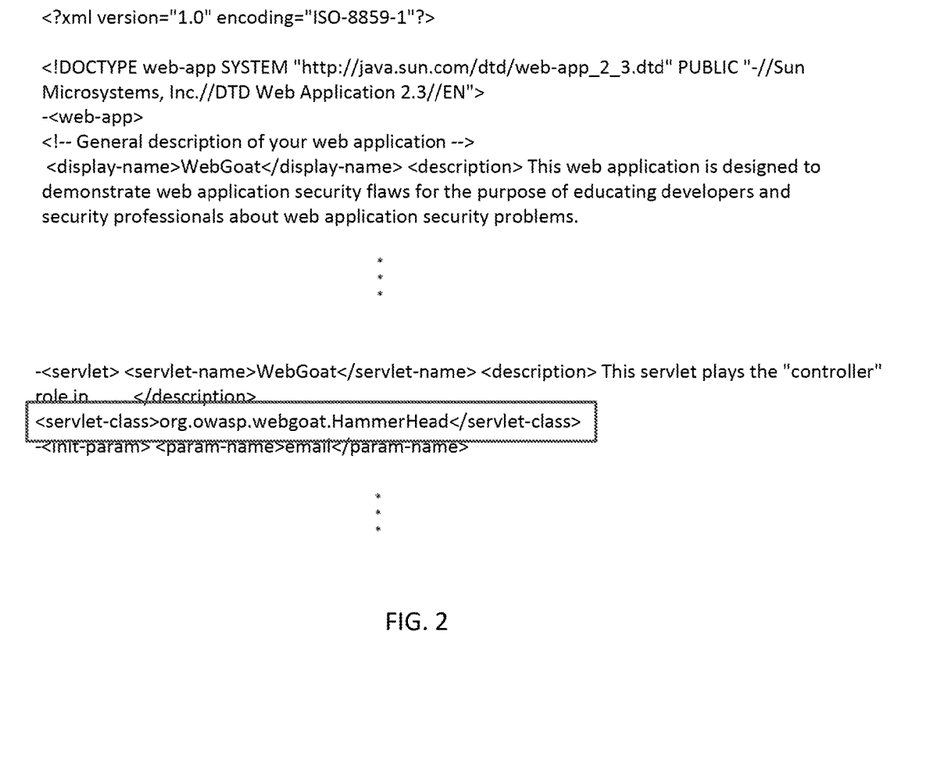
FIG. 2 depicts an example component specified in an example of an EXtensible Markup Language (XML) document.

In some embodiments, one or more of the binary files to be analyzed by the process 100 are obtained by compiling one or more JavaServer Pages (JSP), PHP scripts, etc. One or more primary components in one or more binary files may be selected from an EXtensible Markup Language (XML) script, e.g., by selecting a string using the "XPATH" function in combination with a keyword selected from a specified group of keywords. For example, in a portion of an XML file depicted in FIG. 2, a component "HammerHead" is identified by the path "org.owasp.webgoat.HammerHead." Keywords are not the components; in general, keywords can be root elements of config files.

Information obtained from the analysis in the process 100—the identification of various components used in a software application and their respective paths, in particular—can be used for various beneficial purposes. For example, in some embodiments, a list of entry points, e.g., a list of components/packages analyzed by a static analyzer can be compared with the list of entry points, i.e., components/packages, identified using the process 100. A false negative can be detected if the process 100 identifies a component/package that the static analyzer did not analyze, because the analysis of the static analyzer may be incomplete and/or erroneous due to the failure to analyze all of the components/packages of the software application.

In some embodiments, a listing of all of the components/packages used in a software application can be presented. The components/packages in listing may be classified into two groups—namely developer (first party) supplied components/packages and vendor/third-party supplied components/packages. The second group may be sub-classified into a group of components/packages supplied by commercial vendors and by vendors of open-source code.

In some embodiments, the information obtained using the process 100 can be used to assist static analysis. For example, if a static analyzer is to be developed to analyze any third-party binary code, the effort of the static analyzer may be directed only to the components/packages that are determined to be used in the software application, and not to other portions of a package/library provided by the third party.

In some embodiments, a static analyzer may not analyze any third-party binary code. Nevertheless, as described above, the process 100 can identify any third party libraries/packages that are used in the software application. Information about known vulnerabilities associated with the identified third party libraries/packages can be obtained and the static analysis can be supplemented with such information. In some embodiments, the obtained vulnerability information about the third party libraries/packages may be filtered according to the particular components of those libraries/packages that are determined to be used in the software application. Thus, an alert may be included in the overall static analysis if and only if the vulnerabilities that are known to be associated with a third party library/package are associated with a component of that library/package that is actually used in the software application. This can increase the accuracy and/or relevancy of the vulnerability analysis.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method of determining components of a software application from binary code thereof, the method comprising:
   identifying, by a processor, a first component in a first binary file associated with a software application, without loading in an execution environment any component in the first binary file;
   identifying a second component based, at least in part, on a relationship with the first component indicated in the first binary file, wherein the relationship is at least one of the first component extends the second component or the first component invokes the second component;
   identifying a path specifying an origin of the second component, wherein the path identifies a hierarchical location of the second component within the software application, wherein the origin indicates a party which provided the second component; and
   based on the origin of the second component specified in the path, performing static analysis of the second component.

2. The method of claim 1, wherein the second component is part of a second binary file associated with the software application.

3. The method of claim 1, wherein the second component comprises a vendor-provided component.

4. The method of claim 1, further comprising:
   identifying entry points generated through static analysis of the software application; and
   based on determining that the identified entry points do not comprise the first component, indicating the first component for analysis.

5. The method of claim 1, further comprising:
   identifying a set of developer-provided components based, at least in part, on keywords indicated in a configuration file of the software application;
   wherein identifying the first component in the first binary file is based, at least in part, on the first component being indicated in the set of developer-provided components.

6. The method of claim 1, further comprising:
   identifying a third component related to the second component; and
   based on determining that the third component is included in a second binary file, omitting the third component from static analysis.

7. The method of claim 1, further comprising determining the origin of the second component based, at least in part, on parsing the path and comparing the path to a list of keywords, wherein the path identifies a library which comprises the second component.

8. A system comprising:
   a processor; and
   a computer-readable medium having instructions stored thereon that are executable by the processor to cause the system to,
      identify a first component in a first binary file associated with a software application, without loading in an execution environment any component in the first binary file;
      identify a second component based, at least in part, on a relationship with the first component indicated in the first binary file, wherein the relationship is at least one of the first component extends the second component or the first component invokes the second component;

identify a path specifying an origin of the second component, wherein the path identifies a hierarchical location of the second component within the software application, wherein the origin indicates a party which provided the second component for the software application; and based on the origin of the second component specified in the path, perform static analysis of the second component.

9. The system of claim 8, wherein the second component is part of a second binary file associated with the software application.

10. The system of claim 8, wherein the second component comprises a vendor-provided component.

11. The system of claim 8, further comprising instructions to:

identify entry points generated through static analysis of the software application; and based on a determination that the identified entry points do not comprise the first component, indicate the first component for static analysis.

12. The system of claim 8, further comprising instructions to:

identify a set of developer-provided components based, at least in part, on keywords indicated in a configuration file of the software application;

wherein the instructions to identify the first component in the first binary file are based, at least in part, on the first component being indicated in the set of developer-provided components.

13. The system of claim 8, further comprising instructions to:

identify a third component related to the second component; and based on a determination that the third component is included in a second binary file, omit the third component from static analysis.

14. The system of claim 8, further comprising instructions to determine the origin of the second component based, at least in part, on parsing the path and comparing the path to a list of keywords, wherein the path identifies a library which comprises the second component.

15. A non-transitory, computer-readable medium having instructions stored thereon that are executable by a computing device to perform operations comprising:

identifying a first component in a first binary file associated with a software application, without loading in an execution environment any component in the first binary file;

identifying a second component based, at least in part, on a relationship with the first component indicated in the first binary file, wherein the relationship is at least one of the first component extends the second component or the first component invokes the second component;

identifying a path specifying an origin of the second component, wherein the path identifies a hierarchical location of the second component within the software application, wherein the origin indicates a party which provided the second component for the software application; and based on the origin of the second component specified in the path, performing static analysis of the second component.

16. The computer-readable medium of claim 15, wherein the second component is part of a second binary file associated with the software application.

17. The computer-readable medium of claim 15, wherein the second component comprises a vendor-provided component.

18. The computer-readable medium of claim 15, further comprising instructions executable by a computing device to perform operations comprising:

identifying entry points generated through static analysis of the software application; and based on determining that the identified entry points do not comprise the first component, indicating the first component for static analysis.

19. The computer-readable medium of claim 15, further comprising instructions executable by a computing device to perform operations comprising:

identifying a set of developer-provided components based, at least in part, on keywords indicated in a configuration file of the software application;

wherein identifying the first component in the first binary file is based, at least in part, on the first component being indicated in the set of developer-provided components.

20. The computer-readable medium of claim 15, further comprising instructions executable by a computing device to perform operations comprising:

identifying a third component related to the second component; and based on determining that the third component is included in a second binary file, omitting the third component from static analysis.

* * * * *